(12) United States Patent
Cheon et al.

(10) Patent No.: US 11,757,618 B2
(45) Date of Patent: Sep. 12, 2023

(54) APPARATUS FOR PROCESSING NON-POLYNOMIAL OPERATION ON HOMOMORPHIC ENCRYPTED MESSAGES AND METHODS THEREOF

(71) Applicants: CRYPTO LAB INC., Seoul (KR); SEOUL NATIONAL UNIVERSITY R&DB FOUNDATION, Seoul (KR)

(72) Inventors: Jung Hee Cheon, Seoul (KR); Jai Hyun Park, Seoul (KR); Wootae Kim, Daegu (KR)

(73) Assignee: CRYPTO LAB INC., et al., Seoul (KR)

( * ) Notice: Subject to any disclaimer, the term of this patent is extended or adjusted under 35 U.S.C. 154(b) by 22 days.

(21) Appl. No.: 17/499,793

(22) Filed: Oct. 12, 2021

(65) Prior Publication Data

US 2022/0337390 A1  Oct. 20, 2022

(30) Foreign Application Priority Data

Apr. 7, 2021 (KR) .................. 10-2021-0045002

(51) Int. Cl.
*H04L 9/00* (2022.01)
*H04L 9/30* (2006.01)
(Continued)

(52) U.S. Cl.
CPC ............ *H04L 9/008* (2013.01); *H04L 9/3026* (2013.01); *H04L 9/3093* (2013.01)

(58) Field of Classification Search
CPC ..... H04L 9/008; H04L 9/3026; H04L 9/3093; G06F 17/17; G06F 17/18; G06N 20/00
See application file for complete search history.

(56) References Cited

U.S. PATENT DOCUMENTS 6,735,264 B2   5/2004  Miller
11,374,735 B2  6/2022  Hoshizuki et al.
(Continued)

FOREIGN PATENT DOCUMENTS

JP   2005522061 A   7/2005
JP       6391900 B1   9/2018
(Continued)

OTHER PUBLICATIONS

Extended-range arithmetic and normalized Legendre polynomials, JM Smith, FWJ Olver, DW Lozier—ACM Transactions on Mathematical . . . , 1981—dl.acm.org (Year: 1981).*
(Continued)

*Primary Examiner* — Vu V Tran
(74) *Attorney, Agent, or Firm* — Steinfl + Bruno LLP

(57) ABSTRACT

A method of operating a homomorphic ciphertext is disclosed. The method of operating a homomorphic ciphertext includes receiving a non-polynomial operation command with respect to a homomorphic ciphertext, computing an approximate polynomial function corresponding to the non-polynomial operation, performing an operation of the homomorphic ciphertext using the computed polynomial function, and outputting the operated homomorphic ciphertext, wherein the approximate polynomial function is a second approximate polynomial function which is obtained by extending a first approximate polynomial function to have a second range wider than the first range having a preset accuracy with the non-polynomial operation within a first range.

8 Claims, 10 Drawing Sheets

(51) Int. Cl.
*G06F 17/17* (2006.01)
*G06F 17/18* (2006.01)
*G06N 20/00* (2019.01)

(56) References Cited

U.S. PATENT DOCUMENTS

| | | | |
|---|---|---|---|
| 2003/0081705 A1 | 5/2003 | Miller | |
| 2016/0350648 A1* | 12/2016 | Gilad-Bachrach | G06N 3/08 |
| 2019/0199509 A1 | 6/2019 | Hoshizuki et al. | |
| 2020/0036511 A1* | 1/2020 | Cheon | H04L 63/0428 |
| 2020/0228307 A1 | 7/2020 | Cheon et al. | |
| 2020/0235908 A1* | 7/2020 | Hiromasa | G06N 3/048 |
| 2020/0242466 A1 | 7/2020 | Mohassel et al. | |
| 2021/0351913 A1* | 11/2021 | No | H04L 9/008 |

FOREIGN PATENT DOCUMENTS

| | | |
|---|---|---|
| JP | 2019113777 A | 7/2019 |
| KR | 20200070090 A | 6/2020 |
| KR | 20200087061 A | 7/2020 |
| WO | 2021/050158 A1 | 3/2021 |

OTHER PUBLICATIONS

Effective Activation Functions for Homomorphic Evaluation of Deep Neural Networks, by Gong et al., published Jul. 2020 (Year: 2020).*

Catalano, D., et al., "MoZ2ka: Fast Maliciously Secure Two Party Computation on Z2k.", IACR International Conference on Public-Key Cryptography. Springer, Cham, 2020. 36 Pages.

Cramer, R., et al., "SPDZ2k: Efficient MPC mod 2k for Dishonest Majority", Annual International Cryptology Conference. Springer, Cham, 2018. Crypto 2018, LNCS 10992, pp. 769-798, 2018. 30 Pages.

Korean Notice of Allowance issued for KR Patent Application No. 10-2021-0045002 filed on Apr. 7, 2021, on behalf of Seoul National University R&DB Foundation, et al. Issuance date: Sep. 12, 2021. Korean Original + English Translation. 3 Pages.

Orsini, E., et al., "Overdrive2k: Efficient Secure MPC over Z2k from Somewhat Homomorphic Encryption," Cryptographers' Track at the RSA Conference. Springer, Cham, Feb. 14, 2020. 39 Pages.

Polynomial Approximation on Wide Domain and Logistic Regression over Encrypted Data, Dated Oct. 22, 2020. Korean Original + Partial English Translation. 33 Pages [https://www.boannews.com/media/view.asp?idx=91937&kind=].

Polynomial Approximation on Wide Domain and Logistic Regression over Encrypted Data, Dated Oct. 24, 2020. Korean Original + Partial English Translation. 31 Pages. [http://www.kms.or.kr/meetings/fall2020/].

Boura, C., et al., "Simulating Homomorphic Evaluation of Deep Learning Predictions", Advances in Databases and Information Systems; [lecture Notes in Computer Science; Lect.notes Computer], Springer International Publishing, Cham. May 19, 2019. pp. 212 -230, 19 Pages. XP047510724.

Extended European Search Report issued by the European Patent Office for European Patent Application No. 21204185.9 filed on Oct. 22, 2021 on behalf of Crypto Lab Inc. dated Apr. 19, 2022. 9 Pages.

Aono Y et al., "Scalable and Secure Logistic Regression via Homomorphic Encryption" *Proceedings of the Sixth ACM Conference on Data and Application Security and Privacy*, Mar. 2016, pp. 1-23.

Bos. J. W. et al., "Private Predictive Analysis on Encrypted Medical Data" *Journal of Biomedical Informatics*, vol. 50, Aug. 2014, pp. 1-19.

Japanese Office Action for JP Application No. 2021-174196 filed on Oct. 25, 2021 on behalf of Crypto Lab Inc. dated Dec. 13, 2022 11 pages (English + Original).

Search Report and Written Opinion for Singaporean Application No. 10202111187X filed on Oct. 8, 2021 on behalf of Crypto Lab Inc et al. dated Mar. 9, 2023 12 pages.

* cited by examiner

FIG. 7

---
Algorithm 1 polyDEF $F_{n,r}$ in Example 1
---
Input: $x_0 \in [-1.5^n r, 1.5^n r]$
Output: Approximate $r$-DEF at $x$.
 1: $y \leftarrow \frac{x_0}{r}$
 2: for $i \leftarrow n-1$ to $0$ do
 3: $\quad y \leftarrow y - \frac{4}{27} \frac{1}{2.25^n} y^3$
 4: end for
 5: return $ry$

FIG. 8

Algorithm 2 Approximate sigmoid function in Example 2

Input: Approximation $P(x)$ of sigmoid function on $[-r, r]$ and $x_0 \in [-1.5^n r, 1.5^n r]$.

Output: Approximate sigmoid function at $x_0$.

1: $y \leftarrow \frac{x_0}{r}$
2: for $i \leftarrow n - 1$ to 0 do
3:     $y \leftarrow y - \frac{4}{27} \frac{1}{2.25^n} y^3$
4: end for
5: return $P(ry)$

FIG. 9

---
Algorithm 3 Approximate logistic function with wavy poly-DEF
---
Input: $x \in [-2.45^n \cdot 14.5, 2.45^n \cdot 14.5]$.
Output: Approximate logistic function at $x$.
    // $P(x)$ is the minimax polynomial of the logistic function on $[-14.5, 14.5]$.
1: $y \leftarrow \frac{x}{14.5}$
2: for $i \leftarrow n-1$ to $0$ do
3:     $y \leftarrow y - \frac{4}{27} \frac{1}{6.0025^n} y^3$
4: end for
5: return $P(14.5y)$

FIG. 10

Algorithm 4 Approximate Logistic Regression

Input: Data $D_i \in [0,1]^d$ with label $\ell_i \in \{-1,1\} \; \forall i \in [1, M]$, learning rate $\alpha$, number of iterations $T$, mini-batch size $N$.

Output: Trained logistic regression weight $W$ and bias $b$.

1: for $i \leftarrow 1$ to $M$ do
2:      $z_i \leftarrow \ell_i \cdot (D_i, 1) \in [-1, 1]^{d+1}$
3: end for
4: $\beta \leftarrow 0^{d+1}$
5: for iteration $\leftarrow 1$ to $T$ do
6:      $G \leftarrow 0^{d+1}$
7:      for $i \leftarrow 1$ to $N$ do
8:          Sample $z$ from $z_i$
9:          $x \leftarrow -z \cdot \beta$
10:          for $j \leftarrow 1$ to $\frac{\log(\sqrt{t(\alpha^2 d^2 + 0.6 \alpha d)})}{\log 2.45}$ do
11:              $x \leftarrow x - \frac{4}{6.0025^{n}27} x^3$
12:          end for
13:          $G \leftarrow G + P(x)z$ // $P(x)$ is the degree 9 minimax polynomial of the logistic function on $[-14.5, 14.5]$
14:      end for
15:      $\beta \leftarrow \beta + \frac{\alpha}{N} G$
16: end for
17: $(b, W) \leftarrow \beta$
18: return $(W, b)$

APPARATUS FOR PROCESSING NON-POLYNOMIAL OPERATION ON HOMOMORPHIC ENCRYPTED MESSAGES AND METHODS THEREOF

CROSS-REFERENCE TO RELATED APPLICATION

This application is based on and claims priority under 35 U.S.C. § 119 to Korean Patent Application No. 10-2021-0045002, filed on Apr. 7, 2021, in the Korean Intellectual Property Office, the disclosures of which are incorporated by reference herein in their entireties.

BACKGROUND

1. Field

This disclosure relates to an apparatus and a method capable of computing and performing an approximate polynomial having a wide domain when a non-polynomial operation on homomorphic encrypted messages is performed.

2. Description of Related Art

As the communication technology has been developed and an electronic device is widely distributed, efforts to maintain communication security between electronic devices are continuously performed. Accordingly, encryption/decryption techniques are used in most communication environments.

When a message encrypted by the encryption technique is transmitted to the other party, the other party must perform decryption in order to use the message. In this case, the other party may waste resource and time in the process of decrypting the encrypted data. If the third party hacking is performed while the other party temporarily decrypts the message for operation, the message may be easily leaked to the third party.

In order to solve this problem, a homomorphic encryption method has been studied. The homomorphic encryption is one of the most promising cryptosystems. The homomorphic encryption may perform addition and multiplication on the encrypted data without any decryption process. By exploiting the homomorphic encryption, a client may delegate computation to an untrusted clouding server, send the input data in the encrypted state to a server, and all computations are done without any additional query. As such, the homomorphic encryption may provide a simple and secured structure of delegation of computations on private data.

Machine learning methods utilize personal data, continuously causing personal information-related problems, and recently, many studies to use a homomorphic encryption in machine learning (ML) have recently been conducted. In order to protect personal information in machine learning, the related art has a limitation in the possibility of loss of information, possibility of vulnerability, and the like, but a machine learning solution based on a homomorphic encryption may solve this limitation.

In order to calculate the non-polynomial operation in the machine learning algorithm, most of the homomorphic encryption-based solutions use the non-polynomial in replacement of the approximate polynomial. However, the existing approximation was performed only in a limited range without being performed with respect to the entire real number.

However, there is a problem that the related-art approximation does not fit to other public datasets and hyperparameters, and when the input range of the new dataset is out of the existing domain range, the corresponding model may have a potential to fail.

SUMMARY

Accordingly, the disclosure is designed to solve the above-mentioned problems, and more particularly, to provide an apparatus and a method capable of computing and performing an approximate polynomial having a wide domain when a non-polynomial operation with respect to a homomorphic encryption is performed.

A method of operating a homomorphic ciphertext includes receiving a non-polynomial operation command with respect to a homomorphic ciphertext, computing an approximate polynomial function corresponding to the non-polynomial operation, performing an operation of the homomorphic ciphertext using the computed polynomial function, and outputting the operated homomorphic ciphertext, wherein the approximate polynomial function is a second approximate polynomial function which is obtained by extending a first approximate polynomial function to have a second range wider than the first range having a preset accuracy with the non-polynomial operation within a first range.

The computing the approximate polynomial function may include determining the first approximate polynomial and computing a second approximate polynomial that has a value corresponding to a computation value of the first approximate polynomial in the first range within the first range, and has a value corresponding to a computation value of the first approximate polynomial in an end of the first range within the second range other than the first range.

The computing the second approximate polynomial may include determining a number of iterations and a basic function based on the first range and the second range and iteratively composing the basic function and a scaling basic function corresponding to the basic function by the determined number of iterations to compute a second approximate polynomial.

The non-polynomial operation includes a logistic function, the second range used for the logistic function is computed by Equation below.

$$C_{\alpha,d,t} = \sqrt{(\alpha^2(d+1)^2 + 0.6\alpha(d+1))t}$$

$C_{\alpha,d,t}$ refers to an upper end value of a second range, $\alpha$ refers to a learning rate, d refers to a number of attributes of data, and t refers to a number of learning of logistic regression analysis.

The non-polynomial operation uses at least one function among the logistic function, a hyper tangent function, an erf function, an arc tangent function, a Gaussian function, or a ReLU-n function.

According to an embodiment, an operation device includes a memory configured to store at least one instruction and a processor configured to execute the at least one instruction, wherein the processor, by executing the at least one instruction, based on receiving a non-polynomial operation command with respect to a homomorphic ciphertext, computes an approximate polynomial function corresponding to the non-polynomial operation, and performs an operation of the homomorphic ciphertext using the computed polynomial function.

The approximate polynomial function is a second approximate polynomial function which is obtained by extending a first approximate polynomial function to have a second range wider than the first range having a preset accuracy with the non-polynomial operation within a first range.

The processor may determine the first approximate polynomial, and compute a second approximate polynomial that has a value corresponding to a computation value of the first approximate polynomial in the first range within the first range, and has a value corresponding to a computation value of the first approximate polynomial in an end of the first range within the second range other than the first range.

The processor may determine a number of iterations and a basic function based on the first range and the second range and iteratively compose the basic function and a scaling basic function corresponding to the basic function by the determined number of iterations to compute a second approximate polynomial.

The non-polynomial operation includes a logistic function, the second range used for the logistic function is computed by Equation below.

$$C_{\alpha,d,t} = \sqrt{(\alpha^2(d+1)^2 + 0.6\alpha(d+1))t}$$

$C_{\alpha,d,t}$ refers to an upper end value of a second range, $\alpha$ refers to a learning rate, d refers to a number of attributes of data, and t refers to a number of learning of logistic regression analysis.

The non-polynomial operation uses at least one function among the logistic function, a hyper tangent function, an erf function, an arc tangent function, a Gaussian function, or a ReLU-n function.

According to various embodiments of the disclosure, the previous homomorphic encryption-based machine learning algorithm has replaced a non-polynomial with a polynomial approximation that is valid only in the empirically estimated domain. Accordingly, there is a disadvantage in that an operation is not performed when a dataset or a parameter is increased to an extremely high degree. In contrast, the method according to the disclosure may calculate the range of possible inputs of each non-polynomial function in the machine learning model, and calculate the approximate polynomial that may operate reliably within each range, so it is possible to operate normally in any given dataset and parameters.

In addition, according to an embodiment of the disclosure, the method for generating an approximate polynomial is composed of repeatedly simple functions, and is efficient and friendly with the homomorphic encryption even if an approximate domain is very large.

BRIEF DESCRIPTION OF THE DRAWINGS

FIG. 7 is a diagram illustrating a polynomial extension algorithm according to a first embodiment of the disclosure;

FIG. 8 is a diagram illustrating a polynomial extension algorithm according to a second embodiment of the disclosure;

FIG. 9 is a diagram illustrating a polynomial extension algorithm according to a third embodiment of the disclosure; and FIG. 10 is a diagram illustrating a polynomial extension algorithm according to a fourth embodiment of the disclosure.

DETAILED DESCRIPTION

Hereinafter, the disclosure will be described in detail with reference to the accompanying drawings. Encryption/decryption may be applied to an information (data) transmission process performed in the disclosure, and expressions for describing the information (data) transmission process in the disclosure and claims should all be construed to include the case of encrypting/decrypting although not mentioned separately. Expression in the form of "transmission (transfer) from A to B" or "reception by A from B" includes transmission (transfer) or reception by an intermediate medium and does not necessarily limited to only directly transmission (transfer) or reception from A to B.

In the description of the disclosure, the order of each step should be understood nonrestrictively unless a preceding step must be performed before a subsequent step logically and temporally. That is, except for the exceptional case above, although a process described as a subsequent step is performed before a process described as a preceding step, it does not affect the essence of the disclosure and the scope of the disclosure should be defined regardless of order of steps. Also, description of "A or B" is defined to mean that both A and B are included, as well as selectively indicating any one of A and B. Also, the term "including" in this specification has a comprehensive meaning to further include another component in addition to elements enumerated to be included.

In this specification, only essential components necessary for the description of the disclosure are described and components not related to the essence of the disclosure are not mentioned. Also, only the mentioned components should not be construed to be included in an exclusive sense but should be construed in a non-exclusive sense to include any other component.

In this specification, the term "value" is defined as a concept including not only a scalar value but also a vector.

The mathematical operation and computation of each step of the disclosure described hereinafter may be realized by a computer operation by a coding method known for corresponding operation or computation and/or coding devised suitably for the disclosure.

Specific formulas described hereinafter are exemplarily described among various possible alternatives, and the scope of the disclosure should not be construed as being limited to the formulas mentioned in the disclosure.

For convenience of description, the following is assumed.
a←D: element (a) is selected according to distribution (D)
$s_1, s_2 \in R$: S1 and S2 are each an element belonging to R set.
mod (q): Modular operation with q elements
$\lfloor \cdot \rceil$ : internal value is round off Hereinafter, various embodiments of the disclosure will be described in detail with reference to the accompanying drawings.

Figure 1:
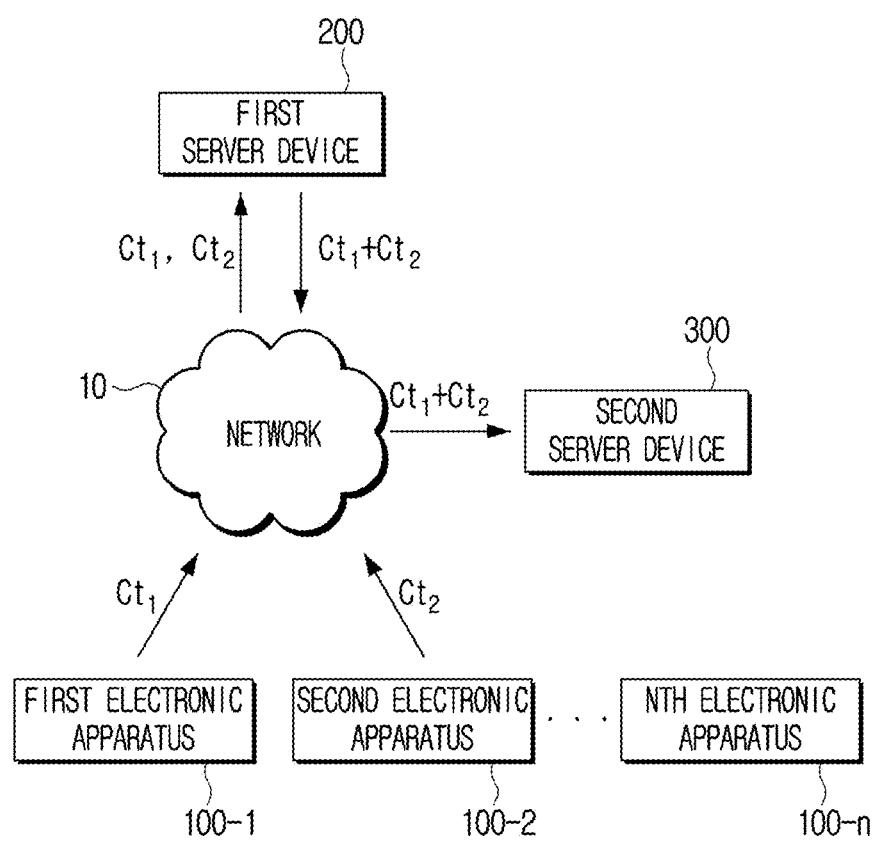
FIG. 1 illustrates a structure of a network system according to an embodiment of the disclosure.

FIG. 1 is a view illustrating a configuration of a network system according to an embodiment of the disclosure.

Referring to FIG. 1, a network system may include a plurality of electronic apparatuses 100-1 to 100-n, a first server device 200, and a second server device 300, and the components each may be connected to each other via a network 10.

The network 10 may be implemented in various types of wired/wireless communication networks, broadcast communication networks, optical communication networks, cloud networks, and the like, and each device may also be connected by a method such as Wi-Fi, Bluetooth, and near field communication (NFC), and the like, without a separate medium.

Referring to FIG. 1, a plurality of electronic apparatuses 100-1 to 100-n are illustrated but the plurality of electronic apparatuses may not necessarily be used and one device may be used. For example, the electronic apparatuses 100-1 to 100-n may be implemented in various types of devices such as smartphones, tablets, game players, PCs, laptop PCs, home servers, kiosks, and the like, and may also be implemented in the form of a home appliance to which an IoT function is applied.

The user may input various information through the electronic apparatuses 100-1 to 100-n which the user is using. The input information may be stored in the electronic apparatuses 100-1 to 100-n, but may be transferred to an external device due to the reason of storage capacity, security, or the like. Referring to FIG. 1, a first server device 200 may function to store the information, and a second server device 300 may function to use some or all of the information stored in the first server device 200.

Each of the electronic apparatuses 100-1 to 100-n may homomorphically encrypt the input information, and transfer a homomorphic ciphertext to the first server device 200.

Each of the electronic apparatuses 100-1 to 100-n may include encryption noise calculated in the process of performing the homomorphic encryption, i.e., an error, in the ciphertext. To be specific, the homomorphic ciphertext generated by each of the electronic apparatuses 100-1 to 100-n may be generated in a form in which a resultant value including a message and an error value is restored, when decrypted later using a secret key.

For example, the homomorphic ciphertext generated by the electronic apparatuses 100-1 to 100-n may be generated in a form satisfying the following properties when decrypted using a secret key.

$$Dec(ct, sk) = <ct, sk> = M + e \pmod{q}$$ [Equation 1]

Here, $<,>$ is a usual inner product, ct is a ciphertext, sk is secret key, M is plaintext message, e is an encryption error value, and mod q is Modulus of the ciphertext. Here, q should be chosen to be greater than a resultant value M obtained by multiplying the message by a scaling factor $\Delta$. If an absolute value of the error value e is smaller enough than M, then a decrypted value M+e of the ciphertext is a value that may replace an original message with the same precision in significant digit operation. Among the decrypted data, an error may be disposed on the least significant bit (LSB) side and M may be disposed on a second LSB side.

If a size of the message is too small or too large, the size of the message may be adjusted using a scaling factor. When the scaling factor is used, even a message in the form of a real number, as well as the form of an integer, may be encrypted, utilization may be significantly increased. In addition, by adjusting the size of the message using the scaling factor, a size of an area in which the messages exist, that is, an effective area, in the ciphertext after the operation is performed may also be adjusted.

According to an embodiment, the ciphertext modulus q may be set and used in various forms. For example, the modulus of the ciphertext may be set in the form of an exponential power $q = \Delta^L$ of the scaling factor $\Delta$. If $\Delta$ is 2, q may be set to a value such as $q = 2^{10}$.

The first server device 200 may store the received homomorphic ciphertext in the ciphertext form, without decrypting the received homomorphic ciphertext.

The second server device 300 may request a specific processing result for the homomorphic ciphertext from the first server device 200. The first server device 200 may perform a specific operation according to a request from the second server device 300, and then transfer a result to the second server device 300.

For example, when the ciphertexts ct1 and ct2 transferred from the two electronic apparatuses 100-1 and 100-2 are stored in the first server device 200, the second server device 300 may request the summed up value of information provided from the electronic apparatuses 100-1 and 100-2, to the first server device 200. The first server device 200 may perform an operation of summing the two ciphertexts according to the request, and then transmit the result value (ct1+ct2) to the second server device 300.

According to the properties of the homomorphic ciphertext, the first server device 200 may perform an operation in a non-decrypted state, and the result is a ciphertext form. In the disclosure, a result value obtained by an operation is referred to as an operation result ciphertext.

The first server device 200 may transmit an operation result ciphertext to the second server device 300. The second server device 300 may decrypt the received operation result ciphertext to obtain an operation result value of the data included in each of the homomorphic ciphertexts.

Figure 4:
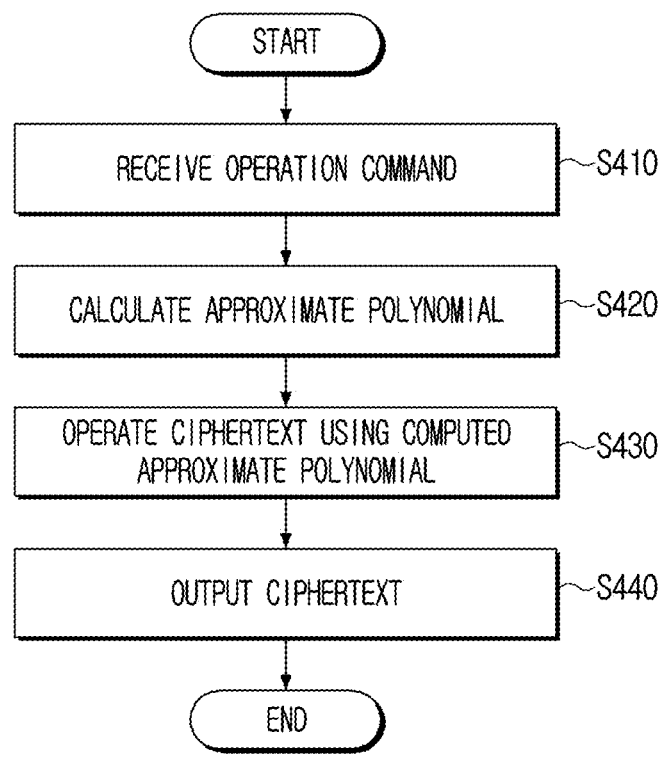
FIG. 4 is a flowchart illustrating a method of ciphertext operation according to an embodiment of the disclosure.

The first server device 200 may perform an operation according to a user request. The first server device 200 may perform a non-polynomial operation used for machine learning, such as a logistic function, as well as an operation consisting of only the addition, subtraction, and multiplication. In this case, the first server device 200 may calculate an approximate polynomial function corresponding to the non-polynomial operation and perform a non-polynomial operation using the calculated approximate polynomial function. The approximate polynomial function, which is calculated herein, is a polynomial that is composed of an operation that may be calculated in a homomorphic encryption. A specific non-polynomial approximation operation is illustrated in FIG. 4.

The first server device 200 may be referred to as an operation device in that the first server device may perform an operation.

Meanwhile, although FIG. 1 illustrates a case that the first electronic apparatus and the second electronic apparatus perform encryption and the second server device performs decryption, the disclosure is not limited thereto.

Figure 2:
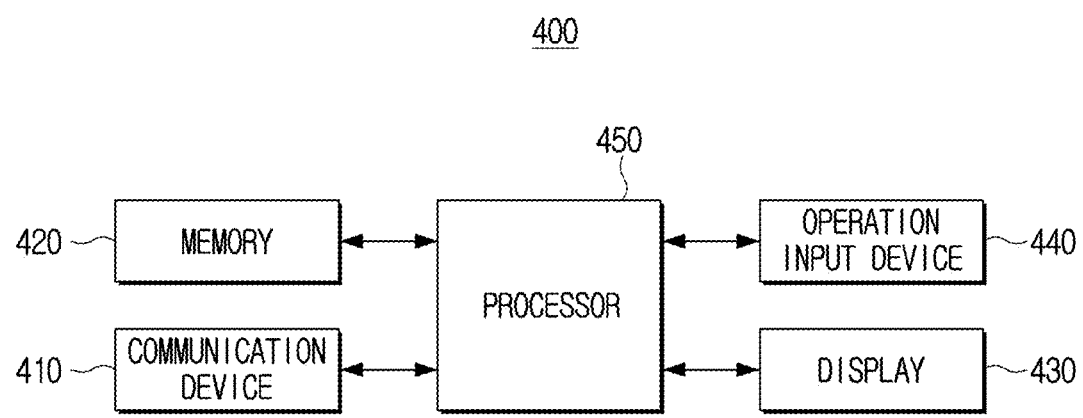
FIG. 2 is a block diagram illustrating a configuration of an operation device according to an embodiment of the disclosure.

FIG. 2 is a block diagram illustrating a configuration of an operation device according to an embodiment of the disclosure.

To be specific, in the system of FIG. 1, the devices that perform homomorphic encryption, such as the first electronic apparatus and the second electronic apparatus, the device that operates the homomorphic ciphertext, such as the first server device or the like, the device that decrypts the homomorphic ciphertext, such as the second server device, and the like, may be referred to as operation devices. The operation devices may include various devices such as a personal computer, a notebook computer, a smartphone, a tablet, a server, and the like.

Referring to FIG. 2, the operation device 400 may include a communication device 410, a memory 420, a display 430, an operation input device 440, and a processor 450.

The communication device 410 is provided to connect the operation device 400 to an external device (not shown), and here, the communication device 410 may be connected to an external device via a local area network (LAN) and the internet or may be connected to the external device through a universal serial bus (USB) port or a wireless communication (e.g., Wi-Fi 802.11a/b/g/n, NFC, Bluetooth) port. The communication device 410 may also be referred to as a transceiver.

The communication device 410 may receive a public key from an external device and transfer a public key generated by the operation device 400 itself to the external device.

The communication device 410 may receive a message from an external device and transfer a generated homomorphic ciphertext to the external device.

In addition, the communication device 410 may receive various parameters necessary for generating a ciphertext from an external device. Meanwhile, in the implementation, various parameters may be directly input from the user through the operation input device 440 to be described later.

In addition, the communication device 410 may receive a request for an operation on the homomorphic ciphertext from the external device and transfer a calculated result to the external device. The requested operation may be, for example, operation such as addition, subtraction, multiplication and may be a comparative operation which is the non-polynomial operation.

At least one instruction regarding the operation device 400 may be stored in the memory 420. To be specific, various programs (or software) for the operation device 400 to operate may be stored in the memory 420 according to various embodiments of the disclosure.

The memory 420 may be implemented in various forms such as a random access memory (RAM), a read-only memory (ROM), a flash memory, a hard disk drive (HDD), an external memory, a memory card, and the like, but is not limited thereto.

The memory 420 may store a message to be encrypted. Here, the message may be various credit information, personal information, and the like quoted by the user or may be information related to a usage history such as location information and Internet usage time information used in the operation device 400.

The memory 420 may store a public key. If the operation device 400 is a device that directly generates a public key, the memory 420 may store various parameters necessary for generating a public key and a secret key, as well as the secret key.

In addition, the memory 420 may store a homomorphic ciphertext generated in a process to be described later. The memory 420 may store a homomorphic ciphertext transferred from an external device. In addition, the memory 420 may store a computation result ciphertext which is a result of the operation as described later.

The memory 420 may store a learning model necessary for machine learning. The memory 420 may store a non-polynomial operation function used in the corresponding learning model and an approximate polynomial (polynomial function with extended range or a polynomial function before extension).

The display 430 displays a user interface window for selecting a function supported by the operation device 400. To be specific, the display 430 may display a user interface window for selecting various functions provided by the operation device 400. The display 430 may be a monitor such as a liquid crystal display (LCD), an organic light emitting diode (OLED), or the like or may be implemented as a touch screen capable of simultaneously performing a function of the operation input device 440 to be described later.

The display 430 may display a message requesting input of a parameter required for generating a secret key and a public key. The display 430 may display a message in which a target of encryption selects a message. Meanwhile, when implemented, the encryption target may be directly selected by the user or may be automatically selected. That is, personal information requiring encryption may be automatically set even if the user does not directly select a message.

The operation input device 440 may receive selection of a function of the operation device 400 and a control command for the corresponding function from the user. To be specific, the operation input device 440 may receive a parameter required for generating a secret key and a public key from the user. In addition, the operation input device 440 may receive a message to be encrypted from the user.

The processor 450 controls an overall operation of the operation device 400. To be specific, the processor 450 may control the overall operation of the operation device 400 by executing at least one instruction stored in the memory 420. The processor 450 may be configured as a single device such as a central processing unit (CPU) or an application-specific integrated circuit (ASIC) or may include a plurality of devices such as the CPU and a graphics processing unit (GPU).

When a message to be transferred is input, the processor 450 may store the message in the memory 420. The processor 450 may homomorphically encrypt the message using various set values and programs stored in the memory 420. In this case, the public key may be used.

The processor 450 may generate a public key required for performing encryption by itself and use the public key or may receive the public key from an external device and use the same. For example, the second server device 300 that performs decryption may distribute the public key to other devices.

When generating a key by itself, the processor 450 may generate the public key using a Ring-LWE technique. To be specific, the processor 450 may first set various parameters and rings and store the set parameters and rings in the memory 420. Examples of parameters may include a length of bits of a plain text, sizes of the public key and the secret key, and the like.

The ring may be expressed by the following equation.

$$R = \mathbb{Z}_q[x]/(f(x)) \qquad \text{[Equation 2]}$$

Here, R denotes a ring, Zq denotes a coefficient, and f(x) is a $n^{th}$ degree polynomial.

The ring, as a set of polynomials with predetermined coefficients, refers to set in which addition and multiplication are defined between elements and which is closed for addition and multiplication. Such a ring may be referred to as a ring.

As an example, the ring refers to a set of $N^{th}$ polynomials whose coefficient is Zq. To be specific, the ring may refer to $N^{th}$ cyclotomic polynomial when n is $\Phi(N)$. Here, $(f(x))$ denotes an ideal of $Zq[x]$ produced by $(x)$. The Euler's totient function $\Phi(N)$ refers to the number of natural numbers which are relatively prime with N and smaller than N. If $\Phi_N(x)$ is defined as the $N^{th}$ cyclotomic polynomial, the ring may also be expressed as Equation 3 below.

$$R = \mathbb{Z}_q[x]/(\Phi_N(x)) \qquad \text{[Equation 3]}$$

Meanwhile, the ring of Equation 3 described above has a complex number in a plain text space. Meanwhile, in order to improve an operation speed for the homomorphic ciphertext, only a set in which the plain text space is a real number, in the set of the ring described above, may also be used.

When such a ring is established, the processor 450 may calculate a secret key sk and a public key pk from the ring. The calculation operation may be generated by another operation device and provided to the corresponding operation device 400.

The processor 450 may generate a homomorphic ciphertext for a message. To be specific, the processor 450 may generate the homomorphic ciphertext by applying the previously generated public key to the message. The processor 450 may generate the length of the ciphertext to correspond to the size of the scaling factor.

When the homomorphic ciphertext is generated, the processor 450 may control the communication device 410 to store the generated ciphertext in the memory 420 or transfer the ciphertext to another device according to a user request or a predetermined default command.

According to an embodiment, packing may be performed. The use of packing in homomorphic encryption makes it possible to encrypt multiple messages in a single ciphertext. In this case, when an operation is performed between the ciphertexts in the operation device 400, an operation burden is significantly reduced because the operation is performed on a plurality of messages in parallel.

To be specific, when a message includes a plurality of message vectors, the processor 450 may convert the plurality of message vectors into a polynomial that may be encrypted in parallel and then, the processor 450 may multiply the polynomial by a scaling factor, and perform homomorphic encryption thereon using a public key. Accordingly, a ciphertext in which a plurality of message vectors are packed may be generated.

When the homomorphic ciphertext is required to be decrypted, the processor 450 may generate a polynomial deciphertext by applying a secret key to the homomorphic ciphertext and generate a message by decoding the polynomial deciphertext. Here, the generated message may include an error as mentioned in Equation 1 described above.

The processor 450 may perform an operation on the ciphertext. For example, the processor 450 may perform an operation such as addition, subtraction, or multiplication, while maintaining the encrypted state regarding the homomorphic ciphertext.

The processor 450 may perform an operation on a polynomial having operations other than the addition, subtraction, or multiplication for the ciphertext. Specifically, the homomorphic ciphertext is closed for addition, subtraction, multiplication, but is not closed for other operations.

Therefore, for operations other than addition, subtraction, and multiplication, an approximate operation expression represented by the above-described three operations should be used. In this regard, the processor 450 may perform an operation using an approximate function corresponding to the operation requested for operations other than addition, subtraction, or multiplication.

For this purpose, a related-art approximation function (e.g., Taylor, Least square, minimax) may be used, but the related-art approximation function is difficult to be applied to machine learning in that the related-art approximation function has a narrow range.

In order to solve this problem, the disclosure calculates (or selects) a first approximation function having a predetermined accuracy within a first range, and calculates a second approximation function which extends the corresponding first approximation function to a second range wider than the first range. As described above, by using the approximation function having a wider range, it is possible to secure the good properties of the existing first approximation function and to simultaneously apply to the machine learning. A method for computing an approximate function will be described below with reference to FIGS. 5 to 11.

Meanwhile, when the operation is completed, the operation device 400 may detect data of a valid area from computation result data. To be specific, the operation device 400 may perform a rounding process on the computation result data to detect data of a valid area. The rounding process refers to round-off of a message in an encrypted state, and may be called rescaling.

In addition, when a portion of an approximate message in the ciphertext exceeds a threshold according to the operation result, the operation device 400 may perform a rebooting operation for ciphertext.

Figure 3:
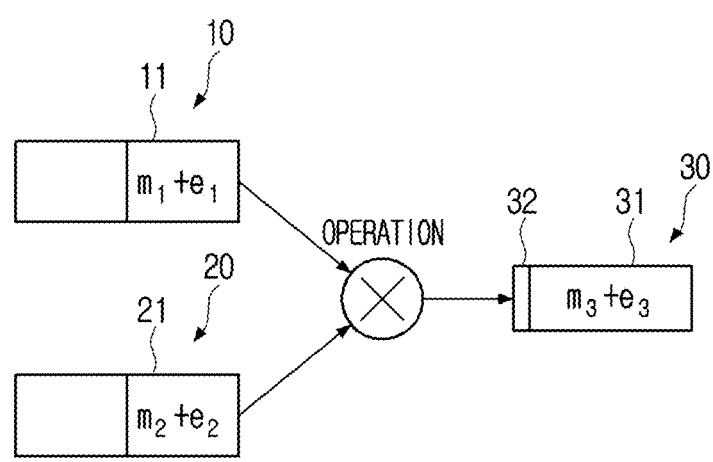
FIG. 3 is a diagram for describing the operation of the operation device of the disclosure.

FIG. 3 is a diagram for describing the operation of the operation device of the disclosure.

Referring to FIG. 3, each homomorphic ciphertext 10, 20 may include approximate message areas 11 and 21, respectively. There are messages and error (m1+e1, m2+e2) together in the approximate message areas 11 and 21.

The operation device 400 may perform a specific operation by using two homomorphic ciphertexts 10, 20 as an input value. This operation may be a polynomial operation consisting of addition, subtraction, multiplication, or may be a polynomial operation or a non-polynomial operation requiring the use of an approximation function.

The non-polynomial operation may include a comparison operation such as a maximum value calculation, a minimum value calculation, a size comparison, and the like, and the machine learning may include logistics function, hypertangent function, erf function, or the like. The calculation operation of the approximation function for the logistic function most frequently used in the machine learning will now be described, but the following operations may be applied to other non-polynomial operations as well as the logistic function.

As described above, a polynomial approximation of the non-polynomial expression is required in order to apply the non-polynomial operation to the homomorphic ciphertext. However, if the input of the non-polynomial is concealed by a homomorphic ciphertext, the domain for the approximation value must be large enough to exceed all candidates for the input.

However, related-art polynomial approximation methods have limitations in calculation by homomorphic ciphertext when applied to a large domain. For example, in order to calculate the minimum approximation of the logistic function on the [−R, R] range, $O(\sqrt{R})$ number of homomorphic multiplication is required. In addition, the parameter of the homomorphic encryption has a large intermediate value during calculation and thus is not practical.

Thus, the disclosure describes an efficient polynomial approximation method having a wide domain. By using the method according to the disclosure, a logistic function on

[−R, R] may be approximated using only O(log R). In addition, since the intermediate value of the calculation maintains a small value, a reasonable homomorphic encryption parameter may be used.

The ciphertext 30 by the above-described operation may include an approximate message region 31 including the result (m3+e3) of the operation between each approximate message. If the plain text space 32 is missing or becomes smaller than the limit value, the operation device 400 may perform a reboot operation.

FIG. 4 is a flowchart illustrating a method of ciphertext operation according to an embodiment of the disclosure.

Referring to FIG. 4, a non-polynomial operation command for the homomorphic ciphertext may be received in operation S410. This command may be input from an external device and may be input directly in the operation device. The non-polynomial operation may be an operation using logistic function or logistic regression analysis.

In operation S420, an approximate polynomial function corresponding to the non-polynomial operation is calculated. Specifically, a first approximation polynomial function having a predetermined accuracy with the non-polynomial operation within a first range may be determined, a value corresponding to a calculation value of a first approximation polynomial within a first range may be determined in a first range, and a second approximation polynomial having a value corresponding to a calculation value of a first approximation polynomial at an end of the first range may be calculated in a second range other than the first range.

The operation for the homomorphic ciphertext may be performed using the calculated polynomial in operation S430.

In operation S440, the operated homomorphic ciphertext may be output in operation S440. If the operation is requested in another device, the operation result may be sent to another device.

As described above, the ciphertext calculation method according to the disclosure may perform an operation by using an approximate polynomial having a wide domain, thereby enabling the operation of the homomorphic ciphertext in machine learning that is difficult to know all candidates of the input.

Hereinbelow, the operation of approximation polynomial calculation operation according to the disclosure will be described in greater detail.

In order to apply a homomorphic ciphertext to machine learning, an approximation to a non-polynomial is required. However, the related-art approximation has a narrow range (i.e., narrow domain or narrow definition), there is a potential problem in which the learning model will not operate when using data in a range different from the dataset used during learning.

To solve this, it is possible to use a polynomial approximation method known to have a wide range. However, the polynomial approximation known to have a wide range is difficult to be calculated in homomorphic encryption. Specifically, as the approximation section becomes wider, the degree of the approximation polynomial is also increased. For example, for the approximation of the logistic function $\sigma(x)=1=(1+\exp(-x))$ in the [−R, R] range so as to have a fixed supremum norm error e, a polynomial expression of O(R) degree is required.

In particular, even if a Paterson-Stockmeyer approach is used to minimize the number of multiplications in a polynomial operation process, multiplication of $O(\sqrt{R})$ is required to produce an approximation.

If the degree of the approximate polynomial is large, a large intermediate value is induced in the calculation. For example, the minimax approximation polynomial of the logistic function on [−1000; 1000] by supremum norm error 0.05 has a 593 degree. To use Paterson-Stockmeyer's method for a polynomial of degree d, one should compute x $\sqrt{d}$ plaintext space of the homomorphic encryption must be large enough to include all the potential huge intermediate values, which entails a large homomorphic encryption parameter.

As described above, the related-art wide range polynomial approximation requires a high computational cost and a very large homomorphic encryption parameter so that there is a difficulty to be applied to machine learning.

In order to solve these problems, the disclosure uses domain extension functions (DEF). The domain extension functions may correct the value from the narrow first range and bring each outline from the secondary region to the closest point of the first interval. Specifically, in a first range, a value corresponding to a calculation value of a first approximate polynomial operating well in a corresponding range is output, and a second approximation polynomial having a value corresponding to a calculation value of a first approximation polynomial at an end of the first range is calculated in a second range greater than the first range.

When combined with the related-art approximate polynomial methods and domain extension functions, the outline from the secondary domain may be reasonably managed while preserving the good feature value of the primary domain. The domain extension functions are particularly advantageous if the target non-polynomial function tends to be peculiar on the primary interval and tends to be flat on the secondary interval. Logistic functions, hyper tangent functions, erf functions, arc tangent functions, Gaussian functions, and ReLU-n functions have these properties. The following focuses on logistic functions and logistic regression analysis to facilitate description.

The method according to the disclosure may use only the o (log R) number for homomorphic multiplication and the minimax polynomial approximation requires only $O(\sqrt{R})$ homomorphic multiplication. In approximating a logistic function having a range [−1000, 1000], the intermediate value according to the present method is less than $1000^3$. This is much more reasonable than $1000^{25}$, which is an intermediate value required for the related-art approximation scheme.

A new homomorphic encryption based method for logistic regression analysis that is not biased to a specific data or hyperparameter will be described using the domain extension functions described above. First, a spacing for a polynomial approximation of each logistic function is calculated in a logistic regression analysis model. Although the estimated spacing is very wide, the domain extension functions may enable efficient calculation with homomorphic encryption.

Hereinafter, the logistic regression will be described first.

The logistic regression is a well-known model that may solve binomial classification problems. The logistic regression model consists of a trained weight W and bias b, and gives the probability $$\sigma(W^T x + b) = \frac{1}{1 + e^{-(W^T x + b)}}$$

of being classified as a specific class '1' for each reference point x. Hereinbelow, two classes were defined as '1', '−1'. The reference point x is combined with additional feature ($W^T x+b=(W^T,b)(x,1)$ as $W^T x$) having 1.

In order to learn the weight and bias b of the logistic regression model, it is assumed that the following cost function is used.

$$J(W) = \frac{1}{n}\sum_{(x,y)} \log(1 + \exp(-y \cdot W^T x)) \quad \text{[Equation 4]}$$

Here, x refers to learning data (or learning datum), W refers to weight, y refers to class, and n is the number of data.

The learning process is to search the weight and bias by minimizing the cost function for the given learning data. The auxiliary parameter and the learning rate a may be updated as follows with respect to the weight and bias.

$$W \leftarrow W - \alpha \nabla J(W) = W + \frac{\alpha}{n}\sum \sigma(-y \cdot W^T x) \cdot (yx) \quad \text{[Equation 5]}$$

Here, W refers to weight, α refers to learning rate, y refers to class, x refers to learning data, and n is the number of data.

Hereinafter, a polynomial approximation method will be described. Although the sigmoid function is specified hereinafter, the approximation method according to the disclosure may be applied to other non-polynomial functions other than the sigmoid function.

<Domain Extension Functions>

The domain extension functions $D_r(x)$ according to the disclosure may be defined as shown below:

$$D_r(x) = \frac{1}{2}(|x+r| - |x-r|) \quad \text{[Equation 6]}$$

Here, $D_r(x)$ refers to the domain extension functions, x refers to an input value, and r refers to integer.

If an integer r is present, such as $f(x)=D_r(x)$, the function F(x) is referred to as the r-domain extension function (r-DEF). If not required, r may be omitted.

If it is assumed that P:[−r, r]→R where r>0 is given, the function domain may be extended by forming P with r-domain extension functions.

$$P \circ D_r(x) = \begin{cases} P(-r), & \text{if } x < -r \\ P(x), & \text{if } -r \leq x \leq r \\ P(r), & \text{if } r < x \end{cases} \quad \text{[Equation 7]}$$

When the input comes from the original domain [−r, r], the same function is performed. Thus, the domain extension function may actually extend the domain of the given function.

<Polynomial DEF>

The polynomial approximation to utilize a domain extension function is considered for a homomorphic encryption algorithm. In particular, the following operation aims to find a polynomial satisfying the core attributes of the domain extension function. The following attribute of the r-domain extension function ($D_r(x)$) may extend the definition of the function.

Prop I. $D_r(x) = x$ on $[=r, r]$

Prop II. $D_r(x) = \begin{cases} r & \text{on } [r, \infty] \\ -r & \text{on } [-\infty, -r] \end{cases}$ Prop III. The image of $D_r(x)$ is bounded by $[-r, r]$ In the case of a given function P:[−r, r]→R, if using the Prop III, P (x) may be appropriately synthesized with the $D_r$ (x). The Prop I makes a configuration for preserving P(x) in [−r, r], and Pro II may reasonably manage the outline input so as to mimic the value at the closest boundary.

In the case of a polynomial, it is difficult to satisfy all core attributes above. Alternatively, an approximate version of each attribute may be used as follows. For a given polynomial Pr and interval [−R, R], the following attributes may be considered.

Prop I'. $Pr(x) \approx x$ on $[-r, r]$

Prop II'. $P_r(x) \approx \begin{cases} r & \text{on } [r, R] \\ -r & \text{on } [-R, -r] \end{cases}$ Prop III'. The image of $Pr(x)$ on $[-R, R]$ is bounded by $[-r, r]$ The attribute may extend the definition of the function from [−r,r] to [−R,R] along with the error of Pr(x).

Now the r-polynomial domain extension function (r-polyDEF) on [−R, R] as a polynomial that satisfies Prop I', II', III' modified for some r is defined. If not needed, r may be omitted.

These polynomial domain extension functions may preserve values within the [−r, r] range, and bring the range out of [−r, r] from the point nearest to [−r, r]. The polynomial domain extension functions have similar properties of having fewer potential errors. Thus, if the f(x) function on [−r, r] is configured as a polynomial domain extension function on [−R, R], the properties of f(x) on [−r, r] may be preserved, and input from [−R, R]\[−r, r] may be reasonably managed.

<Iterative Construction of PolyDEF.>

Hereinbelow, it is assumed that the basic function B(x) is 1-polyDEF on [−L,L] and L>1 is an extension ratio.

The function $B_n(x)$ in which B(x) is scaled to $L^n$ for each positive integer n>0

$$\left(\text{e.g., } B_n(x) := L^n B\left(\frac{x}{L^n}\right)\right)$$

is considered.

For each n, if $Fn(x)=B_0 \circ B_1 \circ \ldots \circ B_{n-1}(x)$ and Fn(x) is $$B\left(L \cdot F_{n-1}\left(\frac{x}{L}\right)\right),$$

it may be identified that whether Prop I', II', III' satisfies Fn(x) on $[-L^n, L^n]$. Therefore, Fn is 1-polyDEF of $[-L^n, L^n]$.

For r>0, by adjusting the size of 1-polyDEF generated in $[-L^n, L^n]$, r-polyDEF on $[-rL^n, rL^n]$ may be obtained. Accurately, the following Equation 8($F_{n,r}$) may be calculated.

$$F_{n,r} := r \cdot F_n\left(\frac{x}{r}\right) \quad \text{[Equation 8]}$$

Example 1

As $$B(x) = -\frac{4}{27}x^3 + x$$

is 1-polyDEF in the range of [−1.5, 1.5], it may be considered the basic function with the extension ratio of 1.5. By using the above structure, Fn and r(x) may be generated with B(x), and the generated $F_{n,r}(x)$ may be r-polyDEF of [−1.5$^n$r, 1.5$^n$r].

Figure 5:
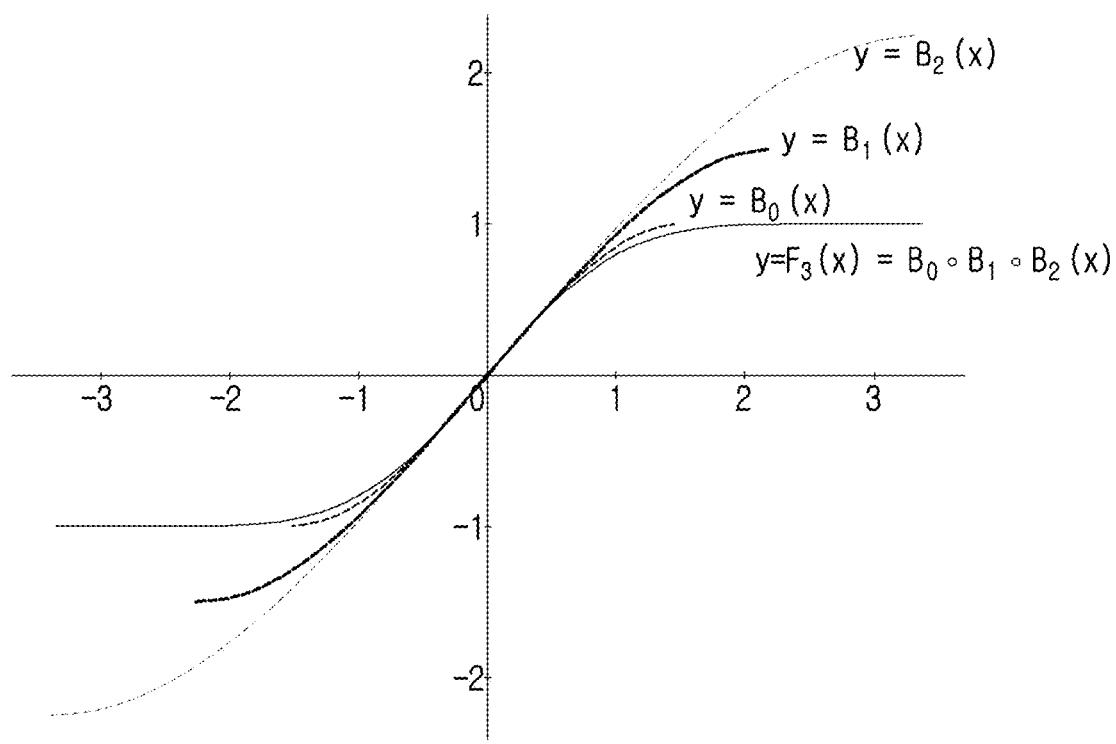
FIG. 5 illustrates an example of a polynomial having an extended range according to a first embodiment of the disclosure.

FIG. 5 illustrates an example of a polynomial having an extended range according to a first embodiment of the disclosure.

Referring to FIG. 5, the basic function (Bx) is the configuration of 1-polyDEF using $$B(x) = -\frac{4}{27}x^3 + x.$$

The $B_1(x)$ is the primary scaled function, and $B_2(x)$ is a secondary scaled function in the basic function. By synthesizing these basic functions and first scaling functions, and then synthesizing the first scaling function and the second scaling function, a polynomial with extended range may be generated. The finally generated $F_3(x)$ is 1-polyDEF on [−1.5$^3$, 1.5$^3$]. The specific algorithm for this approximate polynomial generation operation will be described once again with reference to FIG. 8.

Hereinbelow, extending the range of sigmoid function will be described.

The sigmoid function is a function having S-shape. Although the logistic function σ(x)=1/(1+exp(−x)) is mainly described to facilitate the description of the disclosure, this may be used to another sigmoid function, such as a tan f function, an erf function, and the like.

The polynomial domain extension function may extend a valid domain of the polynomial approximation of σ(x). Hereinafter, it is assumed that the polynomial approximation P(x) for σ(X) is given in [−r, r] intervals. It is assumed that r is sufficiently large so that σ(x)≈1. Then, the domain of P(x) of r-polyDEF Fn,r having an extension ratio L may be extended to [−L$^n$r, L$^n$r].

$$P \circ F_{n,r}(x) \approx \begin{cases} P(-r), & \text{if } -L^n r \le x < -r \\ P(x), & \text{if } -r \le x \le r \\ P(r), & \text{if } r < L^n r \end{cases}$$

$$\approx \sigma(x)$$

After efficient evaluation of Fn,r(x), the approximate polynomial on the narrow domain [−r, r] may be calculated as a logistic function on a wide section [−L$^n$r, L$^n$r].

For example, it may be assumed that the approximate polynomial of the sigmoid function with [−r, r] range is P(x), the approximate domain [−r, r] may be extended to [−1.5$^n$r, 1.5$^n$r] as in Example 1 above. An algorithm 2 for organizing this operation is described in detail in FIG. 8. Using this algorithm 2, it is possible to extend the approximate polynomial that works well in the related-art narrow range to an approximate polynomial that operates in a wider range. Hereinafter, although a representation of extending the range of an existing polynomial is used, it may be expressed that a new polynomial is generated.

Hereinafter, an example of extending a domain of a polynomial approximation of a logistic function by the polyDEF of Example 1 will be described below.

<Proof 1>

For the approximate polynomial P(x) having r≥12, a sup-error ε, and [−r, r] range, algorithm 2 may uniformly approximate σ(x) on [−1.5$^n$r, 1.5$^n$r] with an error of less than ε+0.02.

If it is assumed that proof, x∈ [0, 1.5$^n$r] are given, $x_m = B_{M-n} \circ B_{m-n+1}^\circ \ldots \circ B_n^\circ(x)$ for each m.

[Equation 7]
$$F_{n,r}(x) =$$

$$x - \frac{4}{27}\sum_{i=0}^{n-1} \frac{x_{n-i}^3}{2.25^i r^2} \ge x - \frac{4}{27}\sum_{i=0}^{n-1} \frac{1}{2.25^i r^2} \ge x - \frac{4}{15} \cdot \frac{1}{r^2} x^3$$

Therefore, if $x \ge 5$, $|\sigma(x) - \sigma(F_{n,r}(x))| \le |1 - \sigma(F_{n,12}(5))| \le 0.02$.

If $2.5 \le x \le 5$,

[Equation 8]
$$|\sigma(x) - \sigma(F_{n,r}(x))| \le$$

$$|x - F_{n,r}(x)| \cdot \sigma' F_{n,r}(x) \frac{4}{15 \cdot 12^2} 5^3 \cdot \sigma'\left(2.5 - \frac{4}{15 \cdot 12^2}5^3\right) \le 0.02$$

If $0 \le x \le 2.5$,

[Equation 9]
$$|\sigma(x) - \sigma(F_{n,r}(x))| \le |x - F_{n,r}(x)| \cdot \sigma' F_{n,r}(x) \le \frac{4x^3}{15 r^2} \cdot \frac{1}{4} \le 0.02$$

For each $x \in [0, 1.5^n r]$,

[Equation 10]
$$|\sigma(x) - P \circ \sigma(F_{n,r}(x))| \le$$

$$|\sigma(x) - \sigma(F_{n,r}(x))| - |\sigma \circ F_{n,r}(x) - P \circ F_{n,r}(x)| \le \varepsilon + 0.02$$

Similarly, for $x \in [-1.5^n r, 0]$, the same result is maintained.

These domain extension functions may use the continuous function f(x) to be $$\lim_{x \to -\infty} f(x) = c_1, \quad \lim_{x \to \infty} f(x) = c_2$$

for some constants $c_1$ and $c_2$. The sigmoid function satisfies those conditions. At the same time, $c_0$ functions, such as Gaussian functions, also have these properties. This uses a domain extension function approach to extend the approximate polynomial domain for the $c_0$ function.

Hereinbelow, the stability and efficiency of algorithm using the method described above will be described.

As discussed above, a known wide range of polynomial approximation based on homomorphic encryption is impractical. In contrast, the structure of the polynomial approximation according to the disclosure is a simple basic function and thus is stable and efficient.

The polyDEF structure described above provides the approximation of the logistic function in a repetitive manner. That is, the logistic function having a wide interval may be calculated by repeatedly computing a simple function.

In the example 2 above, the approximate polynomial on the narrow [−r, r] area may be calculated as $$B_n(x) = x - \frac{4}{27} \cdot \frac{1}{2.25^n} x^3$$

to calculate the logistic function on $[-1.5^n r, 1.5^n r]$.

The $B_n(x)$ is a low degree polynomial and the coefficient is gentle, so an error accompanied by an intermediate value and a homomorphic encryption does not overflow. As a result, the polyDEF structure according to the disclosure provides a stable method of approximating a logistic function in a wide area.

In addition, the domain extension using the polynomial domain extension function allows only a predetermined number of homomorphic encryption multiplications. That is, using the configuration of the domain extension function described above, $\sigma(X)=1/(1+\exp(-x))$ may be approximated by a wide range of polynomials having super norm error 0.05.

Proof 1 described above means that domain extension functions may have $O(\ln R)$ homomorphic multiplication and may uniformly approximate logistic functions with $[-R, R]$ ranges. This is also more asymptotic than minimax polynomial approximations that require at least $O(\sqrt{R})$ HE multiplication, even in the Paterson-Stockmeyer algorithm, which minimizes the number of homomorphic multiplications.

In Example 1, a polynomial domain extension function configured by the basic function $$B(x) = x - \frac{4}{27}x^3$$

described each component extending the domain by 1.5 times. The following describes three variants: (a) the basic function of a higher degree (b) an approximation that is friendly to domain extension functions at narrow intervals and (c) a wave reference function of degree 3.

(a) High-Degree Basic Function

For each positive number m, it is assumed that $$B_{m,0}(x) = \int_0^x \left(1 - \frac{x^2}{L_m^2}\right)^m dt.$$

Here, $L_m = \int_0^1 (1-t^2)^m dt)^{-1}$ refers to an extension ratio. The $B_{m,0}(x)$, if 1-polyDEF having a degree of $2m+1$ in a range of $[-L_m, L_m]$, may be taken as the basic function, and the r-polyDEF on $[-L_m^n r, L_m^n r]$ may be configured as described above. More specifically, in considering the scaled function $$B_{m,n}(x) = L_m^n B_{m,0}\left(\frac{x}{L_m^n}\right)$$

and their configurations $F_{m,n,r}(x) = r \cdot B_{m,0} \circ B_{m,1} \circ \ldots \circ B_{m,n-1}(x/r)$, $F_{m,n,r}(x)$ may be r-polyDRF on $[-L_m^n r, L_m^n r]$.

For calculation, $F_{m,n,r}(x)$ requires homomorphic multiplication of $$\sqrt{\frac{m}{2}} \cdot n$$

is necessary if the extension ratio is $L_m^n$. Here, it is true that $m=9$ is more efficient than $m=3$, and $m=3$ may guarantee that the intermediate value is smaller in the calculation process.

Remark 2

The polynomial domain extension function generated in Example 1 is actually $F_{3,n,r}$. Here, the extension ratio is $L_3 = 1.5$.

<Remark 3>

The structure of $B_{m,0}$ is inspired by a method of approximating the sign function through repeated operations. In the disclosure, it is an object of to find an approximate basic function capable of approximating a sign function through a repeated operation like the above task.

<Minimax Approximation with Monotone PolyDEFs>

An approximate $P(x)$ of the logistic function $\sigma(x)$ in the $[-r, r]$ range is assumed in Algorithm 1. It may be considered that the minimax approximation may ensure the best uniform performance. However, when using a monotone polynomial domain extension function, there may be a better approximation than the minimax approximation on $[-r, r]$.

Instead of the minimax approximation of $\sigma \circ F_{n,r}^{-1}(x)$ in the $[-r, r]$ range, a different approximation $Q(x)$ (e.g., $Q(x) \approx \sigma \circ F_{n,r}^{-1}(x)$) range may be used. If the polynomial domain extension function increases significantly, it becomes the inverse function $\sigma \circ F_{n,r}^{-1}(x)$.

In addition, $Q \circ Fn(x)$ may approximate $\sigma(x)$ on $[-1.5^n r, 1.5^n r]$ while securing uniformity error lower than $P \circ Fn(x)$ below:

$$\|\sigma - P \circ F_{n,r}\|_\infty^{[-1.5^n r, 1.5^n r]} = \|\sigma \circ F_{n,r}^{-1} - P \circ F_{n,r} \circ F_{n,r}^{-1}\|_\infty^{[-r,r]} \quad \text{[Equation 11]}$$
$$= \|\sigma \circ F_{n,r}^{-1} - P\|_\infty^{[-r,r]} \geq \|\sigma \circ F_{n,r}^{-1} - Q\|_\infty^{[-r,r]}$$
$$= \|\sigma - Q \circ F_{n,r}\|_\infty^{[-1.5^n r, 1.5^n r]}$$

When summing all, $Q \circ F_{n,r}^{-1}(x)$ provides a uniform approximation of the $\sigma(x)$ on $[-1.5^n r, 1.5^n r]$. This optimum accommodates monotone polynomial domain extensions and may be operated when configuring the monotones by $F_{n,m,r}$ described above.

<Wavy PolyDEF>

Hereinbelow, non-monotone basic function that may extend domain further than monotone will be described.

To maintain stability, a tertiary basic function will be focused. The same function as used in Example 1, that is, $$B(x) = x - \frac{4}{27}x^3$$

with a range of $[-1.5, 1.5]$ will be used. However, the basic function is 1-polyDEF of $(-1.5\sqrt{3}, 1.5\sqrt{3})$ with a wide range, and a higher extension rate of $L>1.5$ is available.

The function of $B(X)$ scaled by 2.45n and the configuration thereof is as shown below.

$$B_n(x) := L^n B\left(\frac{x}{L^n}\right) = x - \frac{4}{27} \cdot \frac{1}{L^{2n}} x^3 \quad \text{[Equation 12]}$$
$$F_n(x) := B_0 \circ B_1 \circ \ldots \circ B_{n-1}(x)$$
$$F_{n,r}(x) := r \cdot F_n\left(\frac{x}{r}\right)$$

In order to configure appropriate polyDEF for logistic function $\sigma(x)$, parameter $(L=2.45, r=14.5)$ will be used.

The reason for trusting the parameter above is as follows: Assuming that the polynomial approximation $P(x)$ of $\sigma(x)$ on $[-r, r]$ with a $\varepsilon < 0.05$ super-standard error was given, it may be said that $P \circ F_{n,r}(x)$ appropriately approximated the $\sigma(x)$ on $[-L_m^n r, L_m^n r]$.

If $\tau=0.27$, each $Bn(x)$ strictly increases with respect to $x \in [-\tau, \tau]$, $Fn(x)$ may increase strictly as well. In addition, $F_n(x) \approx x$. Therefore, for all $x \in [-\tau r, \tau r]$, $P°F_{n,r}(x) \approx P(x) \approx \sigma(x)$.

For $x \in [\tau, L^{n+1}]$, $B_n(x)$ may not be monotone. However, $B_n(L^{n+1})=L^n \cdot B(L) > L^n B(\tau) > B_n(\tau)$, $B_n(x) \in [B_n(\tau), L^n]$ is maintained.

By mathematical induction, one can deduce that $F_{n,r}(\tau r) \leq F_{n,r}(x) \leq r$ holds for all $x \in [\tau r, L^{n+1} r]$. However, $F_{n,r}(\tau) > 3.84$, $\sigma(F_{n,r}(\tau)) > \sigma(3.84) > 0.978$ is very close to 1. Thus, for all $x \in [\tau r, L^{n+1}+r]$, $P°F_{n,r}(x) \approx \sigma(x)°F_{n,r}(x) \approx 1 \approx \sigma(x)$ O|⊏|.

For $x \in [\tau r, L^{n+1}+r]$, $P°F_{n,r}(x) \approx \sigma(x)$. To put it all together, the wavy polyDEF $F_{n,r}(x)$ with $L=2.45$, $r=14.5$ may properly extend the domain.

Figure 6:
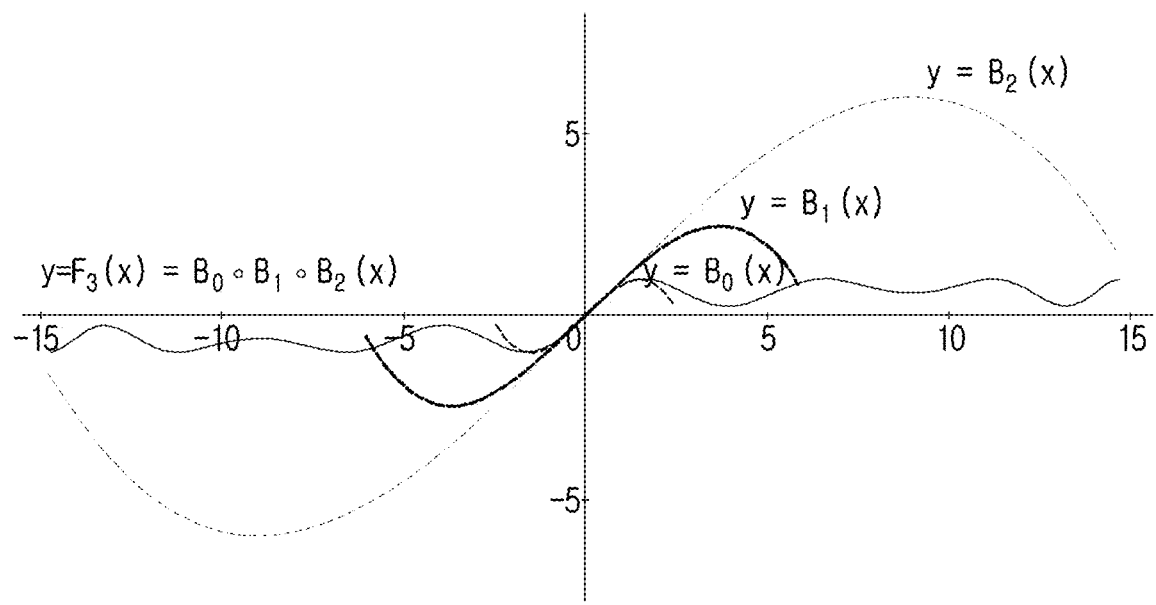
FIG. 6 illustrates an example of a polynomial having an extended range according to a second embodiment of the disclosure.

FIG. 6 is a diagram illustrating an example of an extended polynomial according to a second embodiment of the disclosure. Specifically, FIG. 6 shows a polyDEF composed of a scaling base function for $B(x)$ with an extension ratio of 2.45.

Referring to FIG. 6, the configuration of 1-polyDEF is visualized using $$B(x) = x - \frac{4}{27}x^3$$

on $[-2.45, 2.45]$. The configuration map of $F_3(x)$ is a wavy 1-polyDEF on $[-2.453, 2.453]$. The approximation polynomial described herein may be generated using Algorithm 3 as described below.

FIG. 7 is a diagram illustrating a polynomial extension algorithm according to a first embodiment of the disclosure.

Referring to FIG. 7, Algorithm 1 illustrates a detailed process for efficient evaluation of polynomial domain extension functions for $[-1.5^n r, 1.5^n r]$. Specifically, a first polynomial corresponding to a non-polynomial operation required within a first range is first selected.

A scaling basic function for the selected first polynomial is generated. Specifically, a scaling basic function for a first polynomial is generated. The basic polynomial and the generated scaling basic function may be synthesized to generate an approximate polynomial having a range extended than the first range, and may generate an extended approximate polynomial (i.e., a second approximate polynomial) by repeating the above-described operation by a number of times corresponding to the extension range. The second approximation polynomial, which is finally generated by performing three iterations, is a third function and does not increase the intermediate value.

Referring back to FIG. 7, it may be seen that the finally generated second approximation polynomial $y=F_3(x)$ has a value that is very close to the first approximate polynomial in the first range and has a second range value that is wider than the first range.

FIG. 8 is a diagram illustrating a polynomial extension algorithm according to a second embodiment of the disclosure.

Referring to FIG. 8, the basic polynomial, that is, the first polynomial corresponding to the non-polynomial operation required in the first range is selected first.

A scaling basic function for the selected first polynomial is generated. Specifically, a scaling basic function for a first polynomial may be sequentially generated by a number of times corresponding to an extended range to generate an approximate polynomial having an extended range.

FIG. 9 is a diagram illustrating a polynomial extension algorithm according to a third embodiment of the disclosure.

Algorithm 3 describes an algorithm that approximates the logistic function at a wide interval. When taking the minimax approximation 9 on $[-14.5, 14.5]$, the super-standard error on $[-14.5, 14.5]$ is 0.441, and algorithm 3 may appropriately extend the approximate domain that maintains a super-standard error of less than 0.045.

The logistic regression analysis is a machine learning method for solving a binomial classification problem. Since logistic regression analysis is frequently used in personal data, there is an increasing demand for logistic regression analysis that preserves personal information.

There have been many attempts to perform logistic regression analysis on the basis of homomorphic encryption, but in the related art, the approximate region of the logistic function was not carefully selected. In the related art, it was manually determined whether the input of each logistic function belongs to $[-8, 8]$ in the dataset in which the input of each logistic function is not encrypted. In the related-art, each input of the logistic function using mean pooling was to belong to $[-5, 5]$. However, this related-art approach may lead to potential leaks or data loss. In addition, successful results for randomly given datasets, learning rates, and number of iterations may not be guaranteed, since the approximation interval is too narrow.

In order to solve this problem, the disclosure uses a domain extension function. As described above, the logistic function may be efficiently approximated using a domain extension function. Preferably, the approximate interval for the logistic function may be carefully selected in each iteration of the logistic regression analysis. In order to combine the same with the DEF, a homomorphic encryption algorithm for logistic regression that is not biased with a specific dataset, a learning rate, or an iteration number could be obtained.

Hereinafter, a logistic function will be described with respect to two approximation intervals of each logistic function in a regression analysis.

First, it is assumed that all attributes of the reference point are $[0, 1]$, for example, the highest norm of each reference point is limited by 1 (which is the only assumption).

It is assumed that W is a vector considering the weight of the logistic regression analysis and the bias of the logistic regression. If the learning rate is $\alpha$, the mini batch size is n, and the number of attributes of the data is d, the weight and bias that are respectively trained in the Wt round are shown. Here, x is the reference point sampled in the dataset.

The input of the logistic function may be approximately limited when iteration is made as follows in the iteration relation of the weight (Equation 12).

$$|W_n \cdot x| \leq n\alpha(d+1) \quad \text{[Equation 13]}$$

A $W_n \cdot x$ is the input absolute value of the logistic function. Equation 13 described above indicates that the $[-n\alpha(d+1), n\alpha(d+1)]$ interval includes all intervals of the logistic function in the $n^{th}$ round.

A new homomorphic encryption based method for logistic regression that is capable of training all of the datasets with numerous iterations of various learning rates and encrypted states, while combining with new polynomial approximation using polyDEF will be described.

However, since the interval given by Equation 13 is too wide, too many homomorphic operations are required even if the domain extension function is used. Accordingly, a narrower interval may be introduced as follows.

$$|W_t \cdot x| \leq \sqrt{(\alpha^2(d+1)^2 + 0.6\alpha(d+1))t} \quad \text{[Equation 14]}$$

Equation 14 is calculated by Equation 15 below.

$$\|W_{t+1}\|_2^2 = \|W_t + \frac{\alpha}{n}\sum \sigma(-y \cdot W_t^T x) \cdot (yx)\|_2^2 =$$

$$\|W_t\|_2^2 + \frac{2\alpha}{n}\sum \sigma(-y \cdot W_t^T x) \cdot (y \cdot W_t^T x) +$$

$$\frac{\alpha^2}{n^2}\|\sum \sigma(-y \cdot W_t^T x) \cdot (yx)\|_2^2 \le \|W_t\|_2^2 + 0.6\alpha + \alpha^2(d+1)$$

$$|W_t \cdot x| \le \|W_t\|_1 \le \sqrt{\|W_t\|_2(d+1)} \le \sqrt{(\alpha^2(d+1)^2 + 0.6\alpha(d+1))t}$$

[Equation 15]

Equation 14 may use a more reasonable interval [$-C_{\alpha,d,t}$, $C_{\alpha,d,t}$] for the polynomial approximation of the logistic function in the $t^{th}$ iteration of the logistic regression analysis. Here, $C_{\alpha,d,t}=\sqrt{(\alpha^2(d+1)^2+0.6\alpha(d+1))t}$ $C_{\alpha,d,t}$ refers to an upper end value of the second range, $\alpha$ refers to a learning rate, d refers to the attribute of data, and t refers to the number of logistic regression analysis. Hereinafter, a case of applying to a homomorphic encryption-based logistic regression analysis will be described below.

The disclosure replaces each logistic function with a polynomial approximation for an interval carefully selected. The estimated domain will potentially be wide to ensure successful results in extreme data. Using the method according to the disclosure, a logistic function of a wide area may be efficiently approximated on the basis of a homomorphic encryption.

The following is a valid setting for the polynomial approximation of the logistic function at a wide interval. The $$P^{B(x)=x-\frac{4}{27}x^3}$$

and the extension ratio L 2.45 described above are used. For approximation of the logistic function in the narrow interval, the dfl may take the maximum polynomial of degree 90 in interval [−14.5, 14.5] as follows:

$$P(x)=0.5+0.1939x-4.813e-3x^3+5.992e-5x^5-3.232e-7x^7+6.195e-10x^9$$ [Equation 16]

The polynomial approximation produced by P(x), b(x), and L may then approximate a wide spacing logistic function with a super norm error of less than 0.045.

A HE-based method for personal information protection logistic regression analysis may be performed by combining the above with Equation 16 described above. Such a method is not biased with a particular dataset, a learning rate, or a number of iterations. This operation is specifically shown in the algorithm 4 of FIG. 11.

Hereinbelow, the performance of the enlargement function will be described in detail.

TABLE 1

| Learning rate | Maximum input of the logistic functions | Relative error of HE-trained models(%) |
|---|---|---|
| 0.1 | 5.4 | 6.271 |
| 0.2 | 5.6 | 2.966 |
| 0.4 | 10.2 | 7.293 |
| 0.6 | 19.0 | 6.867 |
| 0.8 | 28.7 | 3.667 |
| 1.0 | 38.4 | 3.753 |
| 1.2 | 46.6 | 2.241 |

TABLE 1-continued

| Learning rate | Maximum input of the logistic functions | Relative error of HE-trained models(%) |
|---|---|---|
| 1.4 | 54.0 | 2.988 |
| 1.6 | 61.3 | 4.858 |
| 1.8 | 68.8 | 4.024 |
| 2.0 | 76.6 | 2.490 |

Table 1 shows the experimental results of the logistic regression analysis of the encrypted state for the MNIST dataset. The second column represents the maximum size of the input of the logistic function during the entire process. As the learning rate increases, the learning rate tends to increase. The third column is the percentage of the weight, which indicates how much the two weights differ. This value may be calculated as $$\left(\frac{\|W_P - W_C\|_2}{\|W_P\|_2} * 100\right).$$

Here, Wp is a training weight for an unencrypted state, and Wc is a training weight in an encrypted state/

TABLE 2

| Learning rate | Accuracy of encrypted model(%) | Accuracy of unencrypted model(%) |
|---|---|---|
| 0.1 | 94.51 | 94.61 |
| 0.2 | 95.72 | 95.77 |
| 0.4 | 96.22 | 96.07 |
| 0.6 | 96.32 | 96.22 |
| 0.8 | 96.12 | 96.17 |
| 1.0 | 96.12 | 96.22 |
| 1.2 | 96.17 | 96.37 |
| 1.4 | 96.02 | 96.27 |
| 1.6 | 95.82 | 96.27 |
| 1.8 | 96.02 | 96.27 |
| 2.0 | 96.12 | 96.32 |

Table 2 shows the accuracy results for the MNIST dataset at various learning rates. The accuracy results for the weighted values trained in the unencrypted state are shown. Referring to Table 2, the encrypted model has 96.32% accuracy when the learning rate is 0.6 and the accuracy is similar to the accuracy of the unencrypted model.

TABLE 3

| Learning rate | Maximum input of the logistic functions | Relative error of HE-trained models(%) |
|---|---|---|
| 0.01 | 3.5 | 8.941 |
| — | Accuracy of encrypted model(%) | Accuracy of unencrypted model(%) |
| — | 81.2 | 81.3 |

Table 3 shows the results of the experimental results for a CiFAR-10 dataset. It may be seen that the model trained in the encrypted state as well as the MNIST dataset has accuracy similar to the trained model in an unencrypted state.

Since the previous HE-based algorithm for the logistic regression has approximated the logistic function in the narrow domain, the related-art learning model may not train the MNIST dataset when the learning rate is large (e.g., greater than 0.4). If the learning rate is lowered to avoid the above, the convergence speed is reduced, and performance is deteriorated. The lower performance of a small learning rate of 0.1, 0.2, and 0.41 in the MNIST dataset supports this. In summary, the previous HE-based algorithm may take a limited learning rate, possibly resulting in performance degradation. In contrast, the disclosure may take any learning rate and obtain good performance with fewer iterations.

The disclosure describes a new framework for privacy assurance of machine learning. Instead of fixing the domain for each polynomial approximation by each non-polynomial, each non-polynomial is approximated by a polynomial of a carefully selected domain. Thus, a new framework according to the disclosure may optionally be performed in a given dataset and a given parameter.

The domain extension function according to an embodiment of the disclosure may be applied to a sigmoid function, such as logistic function, and may efficiently extend an approximate domain of a given approximate polynomial given in a narrow domain. The domain extension function according to the disclosure also has an advantage of maintaining a significantly small intermediate value during calculation.

Meanwhile, according to various embodiments, the method of encryption described above may be implemented in the form of a program code for performing each step and may be stored in a recording medium and distributed. In this case, a device in which the recording medium is mounted may perform the operations such as encryption, ciphertext processing, or the like described above.

The recording medium may be various types of computer-readable mediums such as ROM, RAM, memory chip, memory card, external hard disk, hard disk, CD, DVD, magnetic disk, or magnetic tape.

While the disclosure has been described with reference to the accompanying drawings, it is to be understood that the scope of the disclosure is defined by the claims described hereinafter and should not be construed as being limited to the above-described embodiments and/or drawings. It is to be clearly understood that improvements, changes, and modifications that are obvious to those skilled in the art are also within the scope of the disclosure as defined in the claims.

What is claimed is:

1. A method of operating a homomorphic ciphertext of an operation device comprising a memory and a processor, the method comprising:
receiving a non-polynomial operation command with respect to a pre-stored homomorphic ciphertext in the memory;
computing an approximate polynomial function corresponding to the non-polynomial operation;
performing an operation of the homomorphic ciphertext using the computed polynomial function; and
outputting the operated homomorphic ciphertext,
wherein the approximate polynomial function is a second approximate polynomial function which is obtained by extending a first approximate polynomial function to have a second range wider than a first range having a preset accuracy with the non-polynomial operation within the first range, wherein the computing the approximate polynomial function comprises:
determining the first approximate polynomial; and
generating a second approximate polynomial that has a value corresponding to a computation value of the first approximate polynomial in the first range within the first range and has a value corresponding to a computation value of the first approximate polynomial in an end of the first range within the second range other than the first range.

2. The method of claim 1, wherein
the generating the second approximate polynomial comprises determining a number of iterations and a basic function based on the first range and the second range and iteratively composing the basic function and a scaling basic function corresponding to the basic function by the determined number of iterations to compute a second approximate polynomial.

3. The method of claim 1, wherein
the non-polynomial operation includes a logistic function, the second range used for the logistic function is computed by Equation below:

$$C_{\alpha,d,t} = \sqrt[t]{(\alpha^2(d+1)^2 + 0.6\alpha(d+1))t},$$

wherein $C_{\alpha,d,t}$ refers to an upper end value of a second range, $\alpha$ refers to a learning rate, d refers to a number of attributes of data, and t refers to a number of learning of logistic regression analysis.

4. The method of claim 1, wherein
the non-polynomial operation uses at least one function among the logistic function, a hypertangent function, an erf function, an arctangent function, a Gaussian function, or a ReLU-n function.

5. An operation device comprising:
a memory configured to store at least one instruction and a homomorphic ciphertext; and
a processor configured to execute the at least one instruction,
wherein the processor, by executing the at least one instruction, based on receiving a non-polynomial operation command with respect to the homomorphic ciphertext, generates an approximate polynomial function corresponding to the non-polynomial operation, and performs an operation of the homomorphic ciphertext using the computed polynomial function,
wherein the approximate polynomial function is a second approximate polynomial function which is obtained by extending a first approximate polynomial function to have a second range wider than a first range having a preset accuracy with the non-polynomial operation within the first range, the processor generating the first approximate polynomial, and computes a second approximate polynomial that has a value corresponding to a computation value of the first approximate polynomial in the first range within the first range, and has a value corresponding to a computation value of the first approximate polynomial in an end of the first range within the second range other than the first range.

6. The operation device of claim 5, wherein
the processor determines a number of iterations and a basic function based on the first range and the second range and iteratively composes the basic function and a scaling basic function corresponding to the basic function by the determined number of iterations to compute a second approximate polynomial.

7. The operation device of claim 5, wherein
the non-polynomial operation includes a logistic function, the second range used for the logistic function is computed by Equation below:

$$C_{\alpha,d,t} = \sqrt[t]{(\alpha^2(d+1)^2 + 0.6\alpha(d+1))t},$$

wherein $C_{a,d,t}$ refers to an upper end value of a second range, a refers to a learning rate, d refers to a number of attributes of data, and t refers to a number of learning of logistic regression analysis.

8. The operation device of claim 5, wherein the non-polynomial operation uses at least one function among the logistic function, a hypertangent function, an erf function, an arctangent function, a Gaussian function, or a ReLU-n function.

* * * * *